United States Patent

[11] 3,565,386

| [72] | Inventors | Evert J. Lemkuil<br>Brookfield;<br>Joseph M. Schmerda, Oak Creek; Glenn E.<br>Wanttaja, Hales Corners, Wis. |
|---|---|---|
| [21] | Appl. No. | 800,677 |
| [22] | Filed | Feb. 19, 1969 |
| [45] | Patented | Feb. 23, 1971 |
| [73] | Assignee | General Motors Corporation<br>Detroit, Mich. |

[54] MOUNT FOR A BODY AND COUPLING UNIT THEREFOR
5 Claims, 9 Drawing Figs.

[52] U.S. Cl. .................................................. 248/358
[51] Int. Cl. ................................................... F16f 15/08, B63b 49/00
[50] Field of Search .......................................... 248/1, 2, 15, 20, 21, 22, 27, 176, 358

[56] References Cited
UNITED STATES PATENTS

| 1,915,466 | 6/1933 | Lilly .............................. | 248/358 |
| 2,284,771 | 6/1942 | Schrak ........................... | 248/358 |
| 2,679,369 | 5/1954 | Palley ............................ | 248/15X |
| 2,704,196 | 3/1955 | Beach ............................ | 248/20 |

*Primary Examiner*—Roy D. Frazier
*Assistant Examiner*—William H. Schultz
*Attorneys*—George E. Frost and C. R. Meland ABSTRACT: A mount for a body, such as an inertial navigation unit, in relation to a support, and a coupling unit for use therein. A frame is adjustably mounted on the support and defines a plurality of support regions located in a plane normal to the axis of the frame and caging the body. A plurality of coupling units are sandwiched between each support region and the body. Each coupling unit includes an elastomeric sleeve affixed at its ends to the support region and the body, with its axis passing substantially through the center of mass of the body. Detent units are telescoped within the elastomeric sleeves in substantially coaxial relation therewith. Each detent unit includes a sleeve affixed to the frame and a plunger received therein. Ball detent elements, including ball socket and adjacent ramp conformations, releasably secure the plunger in relation to the sleeve and effect return thereof to original position after release. Adjustable heads on the plunger adjust the preload on the elastomeric sleeves as required to provide predetermined isolation of the body from continuous vibration of the support, release of the detents under predetermined conditions of shock, and restoration of the body to initial position after shock.

PATENTED FEB23 1971
3,565,386
SHEET 1 OF 2
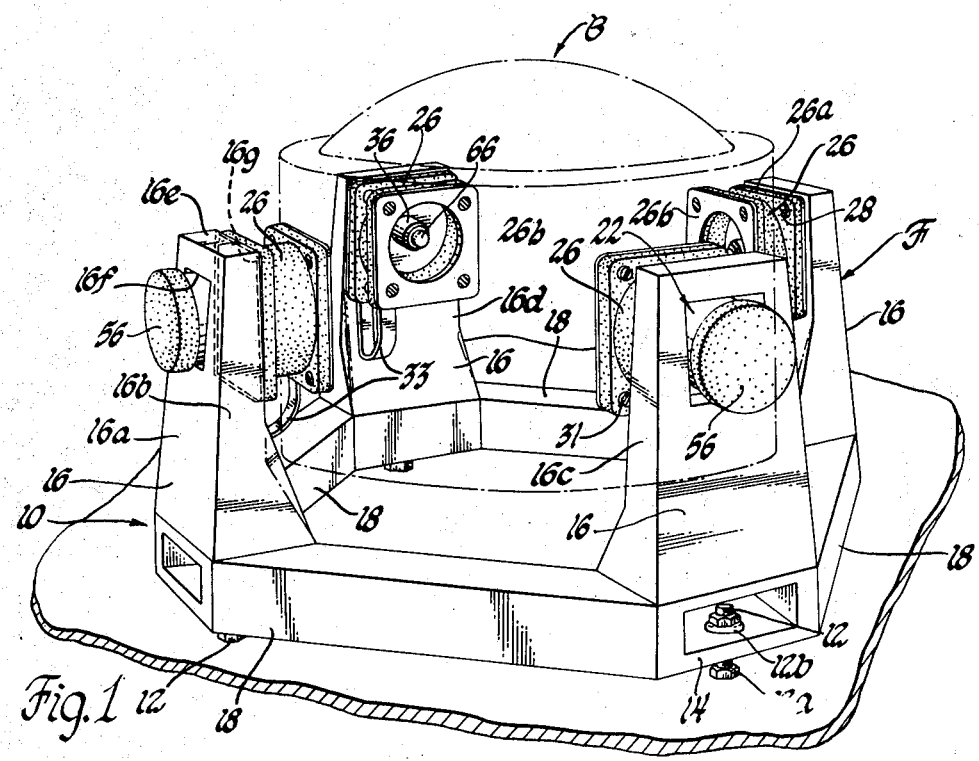
Fig.1
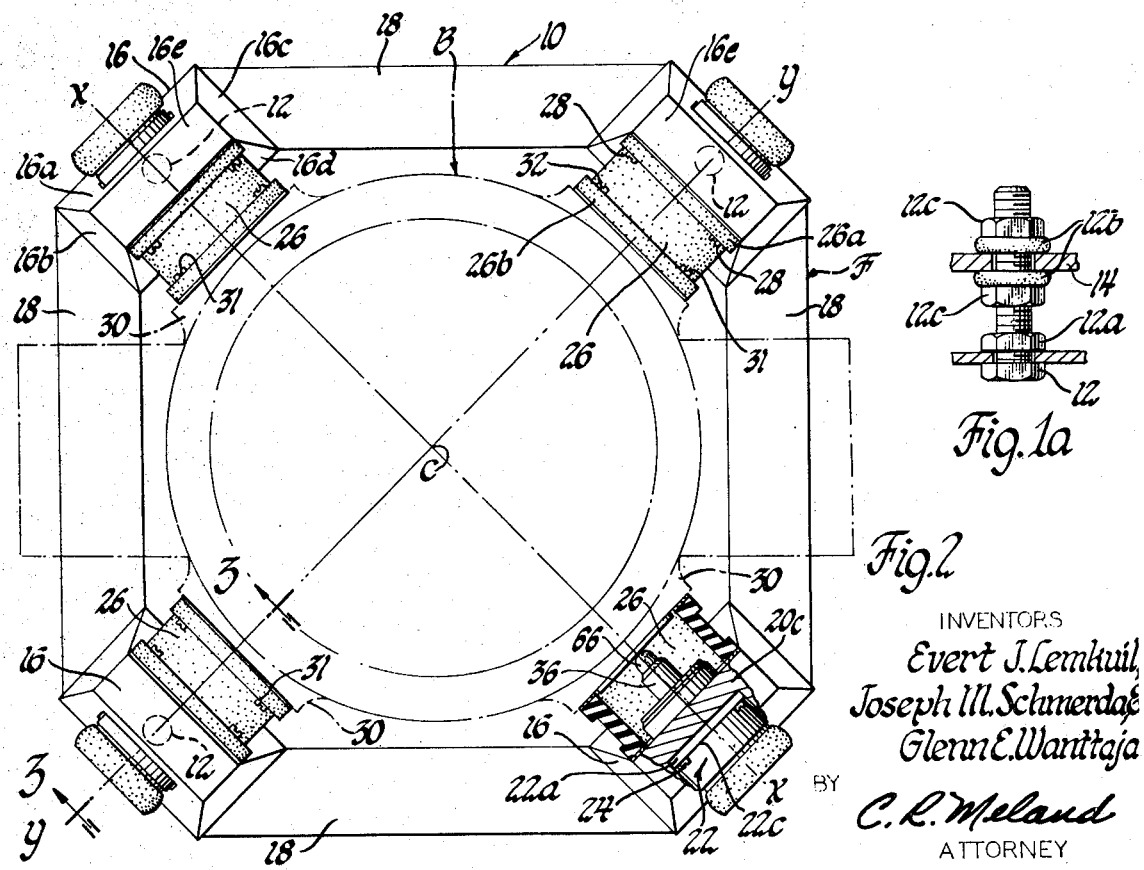
Fig.1a
Fig.2
INVENTORS
Evert J. Lemkuil,
Joseph M. Schmerda,
Glenn E. Wanttaja
BY
C.R. Meland
ATTORNEY

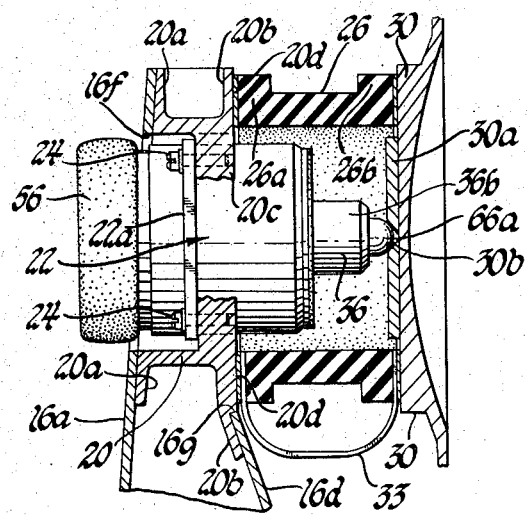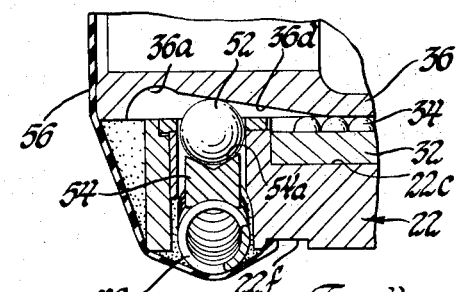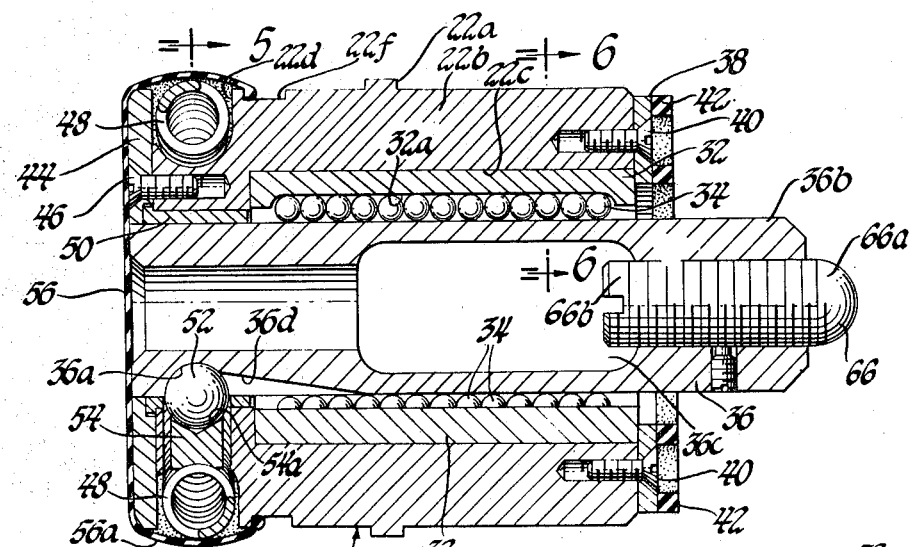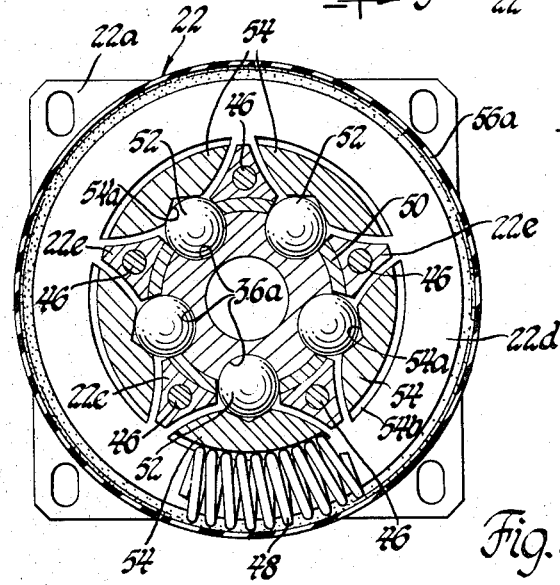

3,565,386

MOUNT FOR A BODY AND COUPLING UNIT THEREFOR

The present invention relates to an improvement mount for a body, such as an inertial navigation unit, and a coupling unit for use therein.

Inertial navigation and other units are used on vehicles such as surface or submarine ships or aircraft which themselves produce or are subject to mechanical vibration and shock. Such vibration or shock, if transmitted to the inertial navigation unit, may cause malfunction thereof or damage thereto. It is accordingly desirable to mount such units in relation to the vehicle in such fashion that vibration and shock are transmitted to the unit only in attenuated form, For practical use, such mount must itself be small in size, light in weight, and otherwise be suitable for use on the vehicle involved.

It is a general object of the present invention to provide an improved mount for a body on a vehicle which is capable of attenuating vibration and shock.

A more specific object of the present invention is to provide such a mount that has adjustable elements making possible the most favorable attenuation of vibration while permitting released relative movement of the body and vehicle under shock conditions.

A still further object of the present invention is to provide apparatus achieving the foregoing objects and in addition restores the body to initial position after shock.

Still another object of the present invention is to provide an improved mount having the foregoing characteristics that has features of construction combination and arrangement making it small in size, suitable for use under adverse environmental conditions encountered on ships, aircraft, and other vehicles, reliable, and relatively inexpensive, to the end that necessary vibration and shock isolation is achieved in a practical manner.

The novel features which we believe to be characteristic of our invention are set forth with particularity in the appended claims. Our invention itself, however, both as to its organization and method of operation, and as to further objects and advantages thereof, will best be understood by reference to the following description taken in connection with the accompanying drawings in which:

FIG. 1 is a view in perspective of a mount constructed in accordance with the present invention, with the supported body shown in phantom;

FIG. 1a is a fragmentary enlarged view, partially in cross section, of one of the adjustable supports for the frame unit;

FIG. 2 is a top plan view of the apparatus of FIG. 1, again with the supported body shown in phantom;

FIG. 3 is an enlarged fragmentary cross-sectional view, with the detent unit in elevation, taken through axis 3—3, FIG. 2;

FIG. 4 is an axial cross-sectional view of the detent unit of FIG. 3, still further enlarged;

FIG. 4a is a fragmentary portion of FIG. 4, showing the parts in the detent-released position;

FIG. 5 is a cross-sectional view through axis 5—5, FIG. 5;

FIG. 6 is a fragmentary view through axis 6—6, FIG. 4; and

FIG. 7 is a fragmentary view through axis 7—7, FIG. 6.

Referring now to FIGS. 1 and 2, there is shown at B the body to be supported by the mount of the present invention. The body is shown in phantom and may, for example, be an inertial navigation unit having a housing with a domed top, a platform mounted in the housing on appropriate gimbals, gyroscopes on the platform to sense rotation from reference position, followup elements responsive to the gyroscopes and effective to torque the platform in amount and direction to compensate for tilting moment, and accelerometers mounted on the platform to sense acceleration of the vehicle involved. The overall unit, in an inertial navigation system might, for example, weigh 65 pounds and have a diameter in the neighborhood of 12 inches as seen in FIG. 2. The spacing between posts 16, FIG. 2, might, in such event, be about 17 inches.

The support portion of the vehicle upon which the body B is to be supported is indicated at 10, FIG. 1, and is shown in fragmentary view. This is preferably a rigid plate of metal and is of normally horizontal orientation. It will be recognized, of course, that if the vehicle is a ship the support 10 will tilt in pitch and will roll with wave action and that in the case of other vehicles similar tilting is to be expected. The frame unit, indicated generally at F, is mounted on and carried by the support 10 through the medium of the adjustable support bolts 12, FIGS. 1, 1a and 2. Each of these is held in upstanding position by means of a clamp unit 12a, or by welding. The base web 14 of the frame F is sandwiched between resilient sleeves 12b. These sleeves or washers are held under adjustable compression and in vertically adjustable position by the nuts 12c, FIG. 1a. By selectively tightening the nuts 12c, it is possible to compress the respective resilient sleeves 12b to provide desired vibration isolation in the vertical direction and to orient the frame F in exact vertical position, as desired. It will be further understood that the specific mechanism here shown and described for mounting and orienting the frame F is for illustrative purposes and that various alternative structures may be used at will.

A series of four upstanding posts 16 extend upwardly from the respective four corners defined by the square formed by the four bottom members 18 of the frame F. It will be noted that these four posts cage the body B in all directions as seen in FIG. 2. As shown, each of the posts 16 is formed by four outboard, side and inboard channel-defining members 16a, 16b, 16c and 16d, FIGS. 1 and 2. A cap 16e closes the top of each of the posts 16, as shown. Below the top edge of each of the posts 16, a rectangular window 16f, FIGS. 1 and 3, is formed in the outboard member 16a. The inboard member 16d is similarly cut out as at 16g, FIGS. 1 and 3. These cutout portions of the outboard member 16a and the inboard member 16d of each upstanding post receives the mating portions of the insert 20. This insert is preferably of solid metal, such as an aluminum alloy. Its outboard flange 20a is welded or otherwise secured to the outboard member 16a. Its inboard flange 20b is defined by a notch portion that registers and mates with the inboard member 16d, all as shown in FIG. 3. Flange 20b is secured to the member 16d by bolts, welding or otherwise. The net effect is to anchor the insert 20 rigidly on the upper part of each of the upstanding posts 16.

Each insert 20 has a rigid web part 20c, FIGS. 2 and 3, that extends across the window 16f, FIG. 3, and has a circular hole that receives the sleeve 22, hereinafter described in detail. This attachment is achieved by the bolts 24 which are received in threaded holes in the rigid web 20c and extend through mating unthreaded holes in the flange 22a of sleeves 22.

On the inboard side, each insert 20 defines a flat annular rim portion 20d, FIG. 3. The mating outboard annular hub 26a of each of the elastomeric sleeves 26 seats against this rim portion, and is affixed thereto by the bolts 28, as shown in FIGS. 1 and 2. The similar inboard flat annular hubs 26b of each of the sleeves 26 similarly seats against a flat mounting pad 30 on the body B and is affixed thereto by screws 31, as shown. The pads 30, it will be noted, define support regions on body B corresponding to the support regions of the frame defined by the inserts 20. The respective support regions are in a plane normal to the vertical axis of frame F, that is upstanding from support plate 10.

It will be noted that the elastomeric sleeves 26 serve as beams supporting the body B. That is, the weight of the body B, with the support 10 substantially horizontal, is sustained by the sleeves 26 in bending moment. The dimensions of these sleeves and their material are chosen to provide adequate structural strength for this support. The sleeves are made of a rubber or rubberlike material, such as neoprene, which is vulcanized and cured as required to provide the vibration isolation described hereinafter. One specific compound that has been used for this purpose is known as "Barry Universal Compound" referred to as "EBR" made by Barry Controls of Waltham, Mass.

Straps 33 are of spring metal and provide electrical grounding.

The coupling units between the frame F and the body B are further composed of detent units defined by the rigid sleeves 22, FIGS. 3—5, and the associated parts. The construction of each such sleeve is shown in detail in FIG. 4. As shown, it consists of a sleeve part 22b having a cylindrical bore 22c which snugly receives the bearing sleeve 32. Inner bearing or bushing sleeve 32 has a plurality of elongated ball raceways 32a which receive balls 34. As shown in FIGS. 6 and 7, these raceways extend axially of the sleeve 32 and are of width to receive two sets of balls 34 so as to define a closed path for ball travel. Along one side, each raceway is relieved so that the balls 34 on that side can roll on the sleeve 32 or the plunger 36 without substantial sliding force on the other, whereas on the other side each raceway defines a clearance substantially equal to the diameters of the balls 34 so that the balls roll in ball-bearing action. This construction, it will be understood, is but one of many alternative constructions that may be used to provide freedom of axial sliding movement of the plunger 36 in relation to the sleeves 32 and 22.

The sleeve 32 is held within the sleeve 22 by the annular cap 38 located at the inboard face of each of the sleeves 22, as shown in FIG. 4. Screws 40 affix the caps 38 to the respective sleeves 22, as shown. A rubber bumper 42, having windows for the screws 40, is provided on the inboard face of the cap 38, as shown.

On its outboard face, each of the sleeves 22 is cut out to form the annular J-shaped notch 22d, as shown in FIGS. 4 and 5. On the outboard face of the sleeve 22b, a dishlike cap 44 is held in place by the screws 46. The cap is annular of diameter substantially equal to that of the body of the sleeve 22. As shown in FIG. 4, the cap 44 cooperates with the notch 22d to form a groove in which the helical garter spring 48 is received. If desired, the garter spring 48 may be of rubber or other elastic material in lieu of a helical spring.

As above mentioned, the plunger 36 is received in the sleeves 22 and 32 for axial sliding movements. Plunger 36 is supported for such movements at its central and inboard portions by the bearings 34. At the outboard portion of the plunger 36, the bearing is defined by the cylindrical face of the plunger and the bearing insert 50, FIGS. 4 and 5. The insert 50, and the face of the plunger 36, are cut out to define the ball sockets 36a, FIGS. 4 and 5. As shown, these sockets are of spherical shape and extend in the inboard direction slightly beyond the radially innermost points of the bearings 52. These bearings are each biased inwardly by the garter spring 48, which bears against the movable inserts 54, FIGS. 4 and 5, each of which has a ball-receiving recess 54a at its inboard face and is rounded at its outer face to receive the garter spring 48. The outer sleeve 22 is cut out to receive each of the balls 52 and the movable inserts or keys 54, leaving the trianglelike shapes seen best in the cross section view of FIG. 5.

Inboard the spherical portion 36a, each of the ball-receiving recesses has a ramp portion 36d. The ramp portions may have, for example, an angle of about 8° in relation to the axis of plunger 36. This portion extends radially outwardly (thus radially expanding) as seen in FIG. 4, to provide release and centering action as hereinafter described.

The outboard end of each sleeve 22 is closed by a thin rubber cap 56, which extends over the garter spring 48 to be received in the annular groove 22f, FIG. 4. As shown in FIG. 4a, this cap expands to accommodate outboard movement of the plunger 36, when such movement occurs.

At its inboard end 36b, the plunger 36 has a threaded hole which threadedly receives the head 66. At its inboard end 66a, this head is generally spherical. At its outboard end 66b, this head is slotted to receive a screwdriver for adjustment. As shown in FIG. 4, a hollow 36c is provided in the plunger 36 to provide screwdriver access to the head 66 when cap 56 is removed.

As shown in FIG. 3, each mounting pad 30 of the body B is provided with a plate 30a at its outer face. This has a conical central indentation 30b, which receives the end of head 66a.

The apparatus above described is adjusted for use by initially setting the heads 66 just touching the plate 30a, as observed by noting the shifting movement of plunger 36 as the head 66 is rotated in the direction to increase its extension. Then the respective plungers are rotated a predetermined further amount. This places each of the elastomeric sleeves 26 under a predetermined compression. The combined stress due to this compression and the moments associated with supporting the body B, coupled with the elastomeric characteristics of the material of the sleeves 26, give the desired degree of isolation of the body B from continuous mechanical vibration of the support member 10. For example, preload of the sleeves 26 may be of the order of 4 g. in a practical unit, thus giving substantial preload in relation to the weight of body B.

In the event the support 10 imparts a shock movement to the frame F, some of the plungers 36 are subjected to force in the outboard direction, causing them to tend to move within the respective sleeves 32. The balls 52 of each such coupler unit are then subjected to outward force due to the cam action of the sockets 36a. If the force exceeds a predetermined minimum, the balls overcome the inboard force exerted through spring 48 and the plunger 36 retracts as shown in FIG. 4a. As the balls 52 ride up the respective inclined recesses 36d, the body B is permitted to move further in response to the shock force, thus lessening the actual movement of the body B and its acceleration. The force required for such movement after the balls are dislodged from sockets 36a is considerably less than that required to dislodge them from the sockets. When the shock force disappears, the spring 48 exerts an inboard force on the balls 52, which in turn exert a force tending to restore the plungers 36 to their original position due to the wedge action of portions 36d of the respective ball-receiving slots. The body B is thereby restored to its original centered position in relation to the frame F. In actual units it has been found possible to restore the body B after high-impact shock to within 15 arc second accuracy.

As viewed in top plan, FIG. 2, the body B has a center of mass indicated at C. The axes X-X and Y-Y of the coupling units, as seen in this view, intersect this center of mass. Preferably, these axes intersect the center of mass as seen in elevation as well as in plan view. This assures that forces imparted to the body B in response to shock in the direction of the plane defined by the axes of the coupling units do not tend to twist the body B. It will be understood, of course, that this ideal condition is not realized in practice and that some departures from the ideal location of the axes are inevitable.

The frame F, as above described is formed of plates of metal-defining channels. Preferably a light metal, such as aluminum is used. Foamed rigid polyurethane plastic having a density of about 4 pounds per cubic foot, for example, (not shown) fills the channels. It has been found that this increases the structural strength and resistance to vibration, thereby contributing to the degree of vibration isolation of the body B.

While the foregoing description is limited to a specific embodiment of the present invention it will, of course, be apparent that various modifications and alternative constructions may be made without departing from the spirit and scope thereof. We therefore intend by the appended claims to cover all modifications and alternative constructions falling within their true spirit and scope.

We claim:

1. A mount for a body having a center of mass in relation to a support and adapted to isolate the body from the support in relation to predetermined vibrations of the support, while releasing the same in the event of predetermined shock applied to the support, and thereafter restoring the same to initial position, the mount comprising in combination:
   1. a frame having an axis;
   2. means mounting the frame on the support for adjustment of the orientation of said axis in relation to the support, the frame defining a plurality of support regions located in a plane normal to said axis and caging the body, whereby supports extending from said regions to the body carry the load of the body in the direction of the axis in beam flexure and resist vibrational or shock movement of the body in said plane in compression or tension; and 3. a plurality of coupling units sandwiched between each support region and the body, respectively, to sustain the body in relation to the frame, each coupling unit comprising:

a. an elastomeric sleeve affixed at its opposite ends to the support and the body, respectively, with its axis passing substantially through the center of mass of the body; and b. a detent unit telescoped within the sleeve, the detent unit having a sleeve affixed to the frame with its axis substantially coaxial with the axis of the sleeve, a plunger received within the sleeve for axial movement therein, the plunger having a ball socket and adjacent ramp radially expanding conformations on its outer surface, a ball received in the sleeve and biased radially inwardly thereof and normally received in said ball socket of the plunger, whereby the plunger forces the ball out of the socket on predetermined axial load and returns to its original position under wedge forces of the ramp thereafter, the detent unit further having an axially adjustable head on the plunger, the head of each plunger being adjusted to preload the elastomeric sleeves as required to provide predetermined isolation of the body from continuous vibration of the support and release of the detents under predetermined conditions of shock.

2. A mount for a body having a center of mass in relation to a support and adapted to isolate the body from the support in relation to predetermined vibrations of the support, while releasing the same in the event of predetermined shock applied to the support, and thereafter restoring the same to initial position, the mount comprising in combination:

1. a frame having an axis;
   2. means mounting the frame on the support for adjustment of the orientation of said axis in relation to the support, the frame defining a plurality of support regions located in a plane normal to said axis and caging the body, whereby supports extending from said regions to the body carry the load of the body in the direction of the axis in beam flexure and resist vibrational or shock movement of the body in said plane in compression or tension; and
   3. a plurality of coupling units sandwiched between each support region and the body, respectively, to sustain the body in relation to the frame, each coupling unit comprising:

a. an elastomeric sleeve affixed at its opposite ends to the support and the body, respectively, with its axis passing substantially through the center of mass of the body; and b. a detent unit telescoped within the sleeve, the detent unit having a sleeve affixed to the frame with its axis substantially coaxial with the axis of the sleeve, a plunger received within the sleeve for axial movement therein, and spring return detent elements connecting the sleeve and the plunger for release under predetermined axial force and and return thereafter, and an axially adjustable head on the plunger, the head of each plunger being adjusted to preload the elastomeric sleeves as required to provide predetermined isolation of the body from continuous vibration of the support and release of the detents under predetermined conditions of shock.

3. A mount for a body having a center of mass in relation to a support and adapted to isolate the body from the support in relation to predetermined vibration of the support, while releasing the same in the event of predetermined shock applied to the support and thereafter restoring the same to initial position, the mount comprising in combination:

1. a frame having an axis;
   2. means mounting the frame on the support, the frame defining a plurality of support regions located in a plane normal to said axis and caging the body;
   3. resilient elements sandwiched between at least some of said support regions and the body to resiliently cage the same against movement in said plane;
   4. detent units sandwiched between at least some of said support regions and the body and effective to cage the same against movement in said plane, each detent unit having cooperating spring detent and ramp elements effective to resist initial movement with an initially high force and after such movement to impart a lesser restoring force, and having adjustable length, whereby extension of the detent units compresses the resilient elements, the detent units being adjusted to provide a substantial preload on the resilient elements in relation to the mass of the body.

4. A coupling unit adapted to cooperate with other like units to support a body having a center of mass in relation to a support, comprising in combination:

an elastomeric sleeve affixed to the support and the body at its opposite ends and having its axis passing substantially through said center of mass;

a sleeve telescoped within said elastomeric sleeve and affixed to said support in substantially coaxial relation to the elastomeric sleeve, said sleeve defining a cylindrical axially oriented bearing surface, and having a peripheral, radially windowed, groove adapted to receive a garter spring;

a plunger received within said last-mentioned sleeve in axially slidable bearing relation to the bearing surface thereof, said plunger having a ball-receiving socket registered with the window of said groove and radially expanding ramp conformations adjacent said socket;

a ball received in said socket;

a garter spring in said groove resiliently urging the ball inwardly, defining a spring detent anchor between the plunger and said last mentioned sleeve; and an axially adjustable head on the plunger, whereby the head of the plunger may be adjusted to preload the elastomeric sleeves of the coupling units as required to provide predetermined isolation of the body from continuous vibration of the support and release of the detents under predetermined conditions of shock.

5. A coupling unit adapted to cooperate with other like units to support a body having a center of mass in relation to a support comprising in combination:

an elastomeric sleeve affixed to the support and the body at its opposite ends and having its axis passing substantially through said center of mass;

a sleeve telescoped within said elastomeric sleeve and affixed to said support in substantially coaxial relation to the elastomeric sleeve, said sleeve defining a cylindrical axially oriented bearing surface, and having a peripheral outer groove adapted to receive a garter spring, said groove having a plurality of radial windows;

a plunger received within said last-mentioned sleeve in axially slidable bearing relation to the bearing surface thereof, said plunger having ball-receiving sockets complementary to and registered with said windows of said groove, and having radially expanding ramp conformations adjacent said sockets;

balls received in said sockets;

presser members received within said windows, respectively, having conformations adapted to engage the balls, respectively, and in engagement therewith, and having outer faces adapted to receive a garter spring in said groove;

a garter spring in said groove resiliently urging the balls inwardly, defining a spring detent anchor between the plunger and said last mentioned sleeve; and an axially adjustable head on the plunger, whereby the head of the plunger may be adjusted to preload the elastomeric sleeves of the coupling units as required to provide predetermined isolation of the body from continuous vibration of the support and release of the detents under predetermined conditions of shock.